July 21, 1953  A. S. CHASE  2,645,875
FISH LURE
Filed Dec. 11, 1950
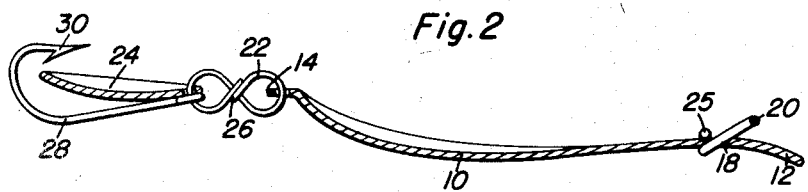
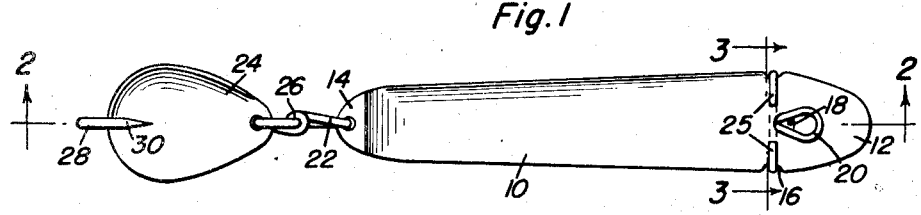
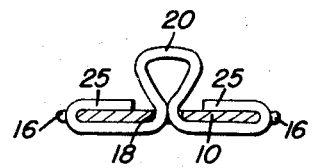
Arthur S. Chase
INVENTOR.
BY *Attorneys*

Patented July 21, 1953

2,645,875

UNITED STATES PATENT OFFICE 2,645,875

FISH LURE

Arthur S. Chase, Weare, N. H.

Application December 11, 1950, Serial No. 200,207

2 Claims. (Cl. 43—42.49)

This invention relates to new and useful improvements in fish lures particularly for trolling and the primary object of the present invention is to provide a fish lure so shaped and constructed as to permit the same to have a unique rolling and swinging action as it is pulled through a fluid medium.

Another object of the present invention is to provide a fish lure including an elongated body having a spoon and a hook attached to one of its ends in such a manner as to permit the spoon and hook to swing back and forth as the body is pulled through the water.

A further object of the present invention is to provide a fish lure embodying a novel and improved means for attaching a fish line to the lure involving a spring wire loop that is yieldingly retained on the lure.

A still further aim of the present invention is to provide a fish lure that is simple and practical in construction, strong and reliable in use, neat and highly attractive in appearance, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the invention;

Figure 2 is a longitudinal sectional view taken substantially on the plane of section line 2—2 of Figure 1; and, Figure 3 is an enlarged transverse vertical sectional view taken substantially on the plane of section line 3—3 of Figure 1.

Referring now to the drawings in detail, wherein for the purpose of illustration, there is disclosed a preferred embodiment of the present invention, the numeral 10 represents an elongated, longitudinally and transversely curved body of suitable metal, shaped as shown in plan as illustrated in Figure 1 of the drawings.

The body 10 terminates in a substantially flat, downwardly curved forward end portion 12. A flat upwardly curved ear 14 is provided at the rear end of the body 10. The concave face of the body faces upwardly so that the body will roll back and firth as the body is pulled through a fluid medium.

Side notches or recesses 16 are provided in the longitudinal side edges of the body 10 at the forward end portion of the body 10. An opening or aperture 18 is formed in the forward portion of the body 10 slightly forwardly of the notches 16. The aperture 18 accommodates an eye 20 through the medium of which a line (not shown) is connected to the lure. The eye 20 is formed from a single length of piano wire that is bent upon itself to form a loop to which the line is secured. The doubled wire is inserted through the aperture 18 from the top of the body 10 and then bent outwardly beneath the body. The end portions 25 of the wire are then bent transversely over the body in the notches 16 in order to retain the eye 20 relative to the body. The eye 20 inclines upwardly and forwardly from the body above the end portion 12.

A link 22 is employed for securing a pearl spoon 24 to the ear 14. The link 22 is formed from a single length of piano wire that is bent to the form of the number 8, the end portions of the link forming wire being inserted through the ear 14 and the spoon 24 and secured to an intermediate portion of the wire, as at 26. The construction and arrangement is such as to prevent the spoon 24 from making a complete turn relative to the body 10. Mounted on the link 22, beneath the spoon 24, is a hook 28 whose bill portion 30 projects over the rear end portion of the spoon 24.

In practical use of the lure, as the device is pulled through a fluid medium it does not spin but oscillates, describing what may be referred to as a half roll, first one way and then the other. The spoon 24 and the hook 28 swing laterally back and forth, giving the lure the appearance of a swimming fish.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fish lure comprising an elongated body having notches in its longitudinal edges adjacent one of its ends, said body also having an aperture in one of its ends between said notches, and an eye on the body for connecting a line thereto, said eye being formed from a single length of wire and having an intermediate portion bent to form a loop for receiving a line, said wire passing through the aperture and extending laterally therefrom in opposite directions and having its end portions reversely bent over the body and engaged in the notches the plane of the eye being at an acute angle to the plane of the portions engaged in the notches.

2. A fish lure comprising an elongated body having a flat transverse forward portion formed with a central aperture and edge notches, a wire loop disposed above the body and having ends extending downwardly through the aperture, a pair of U-shaped elements having upper and lower legs, the lower legs of said elements being integrally formed with the ends of the loop and engaging th undersurface of said transverse portion on opposite sides of the aperture, the bights of said elements being received in said notches and the upper legs of said elements engaging the upper surface of said transverse portion the plane of the eye being at an acute angle to the plane of the portions engaged in the notches.

ARTHUR S. CHASE.

References Cited in the file of this patent

UNITED STATES PATENTS

| Number | Name | Date |
|---|---|---|
| 570,687 | Stanley | Nov. 3, 1896 |
| 816,416 | D'Ailly | Mar. 27, 1906 |
| 1,309,966 | Sebenius | July 15, 1919 |
| 1,450,546 | Hansen | Apr. 3, 1923 |
| 1,471,280 | Reekers | Oct. 16, 1923 |
| 1,533,022 | Mead | Apr. 7, 1925 |
| 2,003,366 | Jordan | June 4, 1935 |
| 2,298,691 | Greggains | Oct. 13, 1942 |